Feb. 17, 1925.                                                  1,526,958
G. S. BLAKESLEE
DISHWASHING MACHINE
Filed July 6, 1920
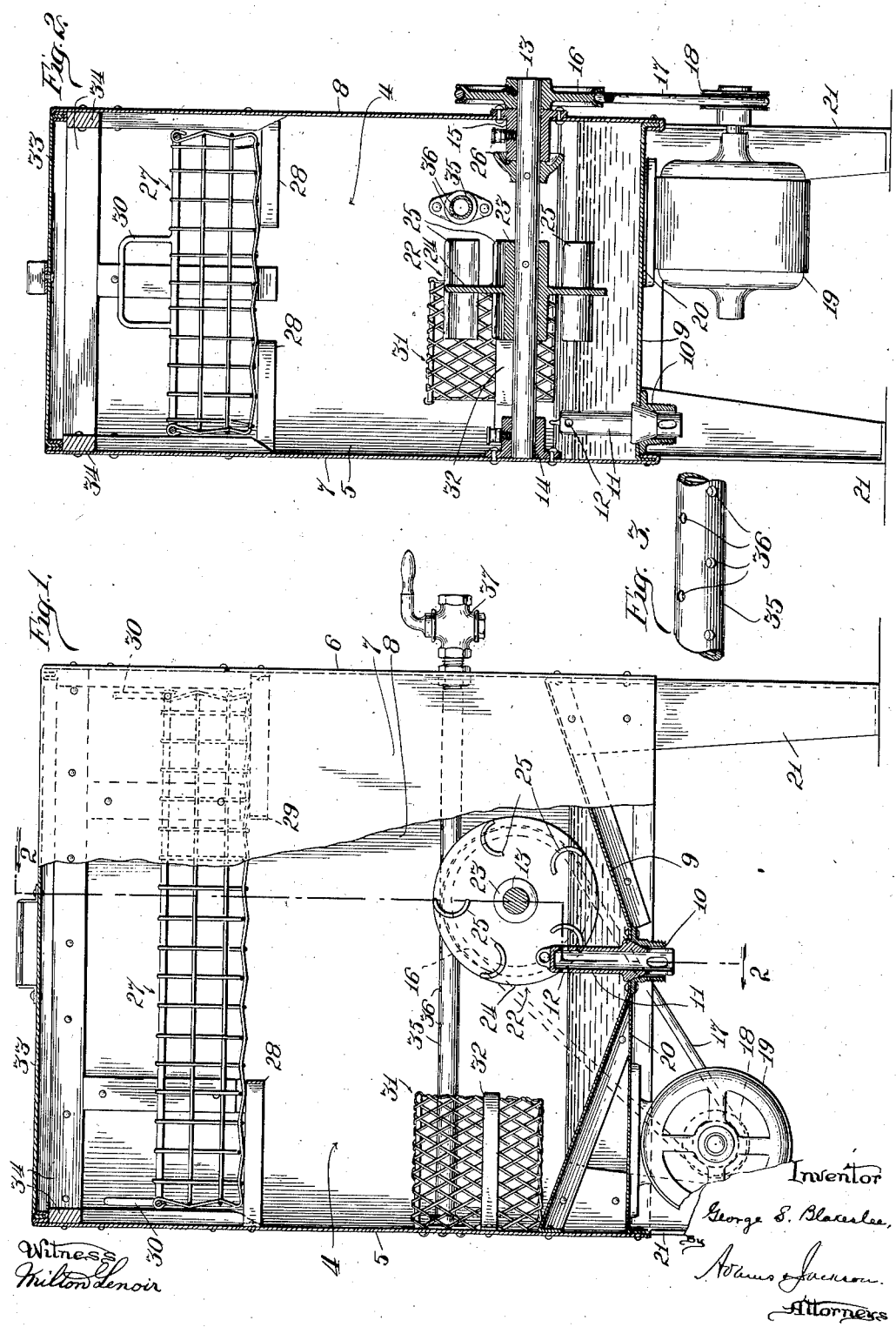

Patented Feb. 17, 1925.

1,526,958

UNITED STATES PATENT OFFICE.

GEORGE S. BLAKESLEE, OF OAK PARK, ILLINOIS; GEORGE R. BLAKESLEE EXECUTOR OF SAID GEORGE S. BLAKESLEE, DECEASED.

DISHWASHING MACHINE.

Application filed July 6, 1920. Serial No. 394,301.

*To all whom it may concern:*

Be it known that I, GEORGE S. BLAKESLEE, a citizen of the United States, and a resident of Oak Park, in the county of Cook and State of Illinois, have invented certain new and useful Improvements in Dishwashing Machines, of which the following is a specification, reference being had to the accompanying drawings.

My invention relates to machines for washing dishes and has for its object to provide a comparatively small, compact, and easily operated machine suitable for household use, by the use of which the dishes may be thoroughly cleansed and rinsed. I accomplish this object as illustrated in the drawings and as hereinafter described. What I regard as new is set forth in the claims.

In the accompanying drawings,—

Fig. 1 is a side elevation of my improved machine, part of one side being broken away and certain parts being shown in section;

Fig. 2 is a vertical section on line 2—2 of Fig. 1; and

Fig. 3 is a plan view of part of the spray pipe through which the rinsing water is introduced.

Referring to the drawings,—4 indicates a tank in the form of a rectangular box of which 5, 6 are the end walls, and 7, 8 the side walls. 9 indicates the bottom of the box which is trough shaped so as to form a valley in which the wash water stands. At its lowest point the bottom is provided with an outlet 10 normally closed by a vertically movable plug 11. This plug may, however, be lifted to permit the water in the tank to escape. Any suitable means may be provided for moving the plug 11 into or out of operative position. Said plug is hollow as shown in Fig. 1, and it is provided at its upper portion with one or more perforations 12 which serve as an overflow discharge and prevent filling of the tank beyond a predetermined depth.

Extending across the lower portion of the tank a short distance above the level of the water therein is a shaft 13 mounted in suitable bearings 14, 15, as shown in Fig. 2. One end of said shaft extends out of the tank, and is provided with a pulley 16 which is adapted to be operatively connected by a belt 17 with a pulley 18 mounted on the armature shaft of an electric motor 19, as shown in Figs. 1 and 2. This motor is secured to a plate 20 fastened to the under side of the tank as shown in Fig. 1. The legs 21 of the tank are made long enough so that the tank is supported far enough above the floor to permit the motor 19 to be placed under the bottom of the tank.

22 indicates a paddle wheel mounted on the shaft 13 about midway of the length thereof, the lower portion of said paddle wheel being arranged to dip into the water in the tank. Preferably this paddle wheel is constructed as shown in Figs. 1 and 2, and comprises a hub 23, a radial web 24, and a series of blades or buckets 25 which are semi-cylindrical in form, and extend transversely from both sides of the web 24. It will be understood that by the rotation of the paddle wheel in a clockwise direction as viewed in Fig. 1, the buckets will take up water and throw it violently upward throughout the upper portion of the tank. The paddle wheel is rotated at a high rate of speed so that when it is in operation the tank is filled with flying water so that all parts of the articles therein are thoroughly washed. To prevent the water thrown by the paddle wheel from escaping through the bearing 15, a cup like shield 26 is mounted on the shaft 13 over the inner end of the bearing, as shown in Fig. 2.

The articles to be washed are mainly supported in the upper portion of the tank by means of a removable basket 27 of any suitable reticulated construction, such as woven wire, said basket being supported by brackets 28, 29 secured to the walls of the tank. The basket is provided with handles 30 at its ends by means of which it may readily be introduced to or removed from the tank. 31 indicates a smaller basket adapted to contain silver or other small articles, which is supported by means of a strap 32 in the form of a loop, which is secured to one of the end walls as shown in Fig. 1. The basket 31 when in place rests upon the upper portion of the bottom 9 near the end wall 5, as shown in Fig. 1.

33 indicates a cover for the tank which fits closely into the upper end thereof, and prevents the water in the tank from escaping in that direction. Said cover rests upon a sill 34 which extends around the upper margin of the tank, and is fixedly secured thereto.

35 indicates a pipe which extends across the lower portion of the tank, at a point above the level of the shaft 13. This pipe is disposed transversely of said shaft, and is placed opposite and adjacent to the upper portion of the paddle wheel so that it does not interfere with the water thrown by said wheel, and the paddle wheel does not interfere with the water discharged from said pipe in the manner hereinafter described. Consequently, if desired water may be simultaneously delivered from both sources. The pipe 35 is provided throughout its length with a number of perforations 36 dispersed over its upper surface so that water under pressure admitted to said pipe will be discharged upwardly in a fan-shaped manner, and, therefore, will be directed to all parts of the upper portion of the tank, thereby rinsing the articles in the basket 27 by direct action, and incidentally rinsing the articles in the basket 31. One end of the pipe 35 extends out of the tank, and is provided with a cock 37 by means of which it may be readily connected with any suitable source of water—preferably hot water—under pressure. By means of the cock 37 the water supplied to the pipe may be turned on or off at pleasure.

It will be understood from the foregoing description that the articles to be washed are packed in suitable baskets, such as the baskets 27 and 31, after which the basket 31 is first placed in position in the tank, and then the basket 27. The cover is then closed and the motor 19 is started. This rotates the paddle wheel 22 so that the water in the tank, which is preferably soapy hot water, is thrown violently upward against the dishes, and is distributed generally throughout all the upper portion of the tank. At the same time a portion of the water is thrown against the articles in the basket 31. After this operation has continued for a few minutes the dishes will have been thoroughly cleansed, whereupon the motor is stopped and hot rinsing water is introduced through pipe 35. This rinsing water is sprayed upward over the washed dishes, so that they are not only rinsed, but are highly heated, and, therefore, quickly dry spontaneously after their removal from the tank. When the rinsing has been completed, the rinsing water is shut off and the baskets removed.

It will be noted that the tank illustrated is considerably longer than it is wide; that the paddle wheel shaft extends transversely of the tank, and that the sprinkler pipe 35 extends longitudinally of the tank. This arrangement is advantageous because a single paddle wheel may be efficiently employed to throw water to all parts of the tank, and the rinsing pipe may be located at one side thereof so that neither of the two water throwing means interferes with the other.

What I claim as my invention and desire to secure by Letters Patent, is—

1. A dish washing machine comprising a rectangular tank adapted to contain wash water, a shaft extending across the lower portion of said tank above the level of the water therein, a paddle wheel mounted on said shaft and arranged to dip into the water in said tank, means in said tank above said paddle wheel for supporting a reticulated container for the articles to be washed, and a stationary spray pipe in said tank extending transversely of said paddle wheel shaft at one side of said paddle wheel and below the articles to be washed.

2. A dish washing machine comprising a rectangular tank adapted to contain wash water, a shaft extending across the lower portion of said tank above the level of the water therein, a paddle wheel mounted on said shaft and arranged to dip into the water in said tank, means in said tank above said paddle wheel for supporting a reticulated container for the articles to be washed, and a stationary spray pipe in said tank extending transversely of said paddle wheel shaft at one side of said paddle wheel and below the articles to be washed, said spray pipe having perforations at its upper side only whereby water will be discharged therefrom in an upward direction.

3. A dish washing machine comprising a rectangular tank adapted to contain wash water, a paddle wheel mounted to rotate in the lower portion of said tank and to dip into the water therein, means in said tank above said paddle wheel for supporting a reticulated container for the articles to be washed, means in the lower portion of said tank opposite said paddle wheel for supporting a container for articles to be washed, and spraying means extending longitudinally of the lower portion of said tank transversely of and at one side of the axis of said paddle wheel.

GEORGE S. BLAKESLEE.